(No Model.)
H. R. ROBBINS.
WEIGHING AND DUMPING WAGON.
No. 256,373. Patented Apr. 11, 1882.
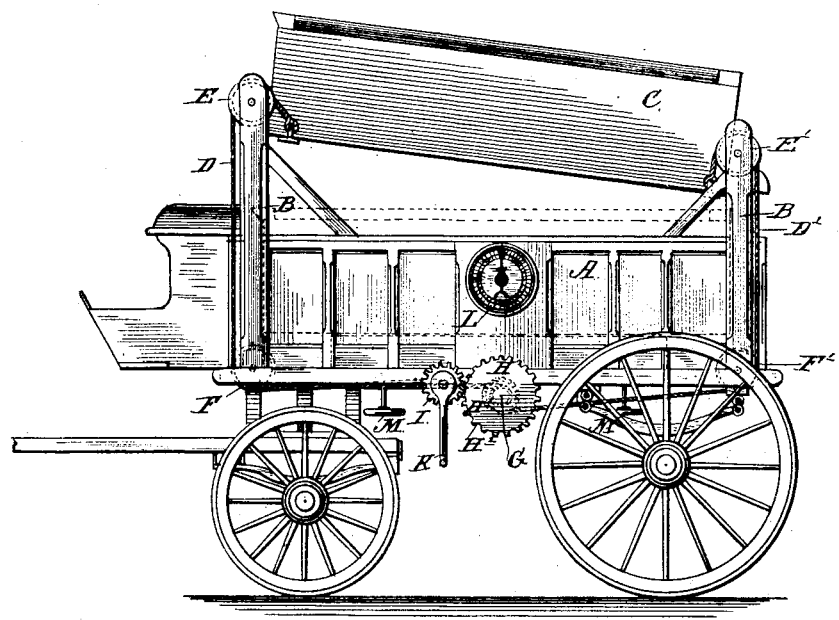
Fig. 1.
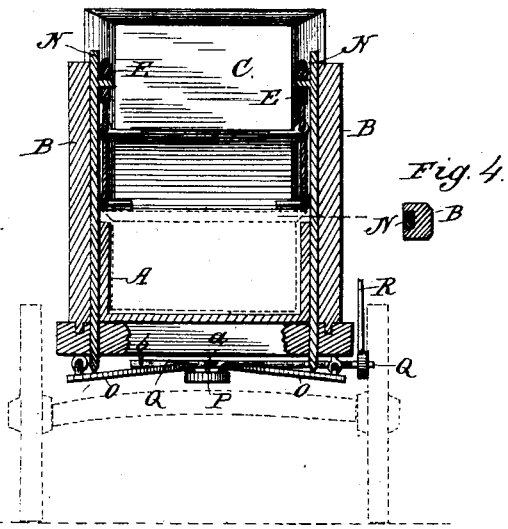
Fig. 2.
Fig. 3.
Fig. 4.
WITNESSES:
Fred. G. Dieterich
Edw. W. Byrn
INVENTOR:
H. R. Robbins
BY
ATTORNEYS.

UNITED STATES PATENT OFFICE.

HENRY R. ROBBINS, OF BALTIMORE, MARYLAND.

WEIGHING AND DUMPING WAGON.

SPECIFICATION forming part of Letters Patent No. 256,373, dated April 11, 1882.

Application filed November 15, 1881. (No model.)

*To all whom it may concern:*

Be it known that I, HENRY R. ROBBINS, of Baltimore city, State of Maryland, have invented a new and Improved Weighing and Dumping Wagon; and I do hereby declare that the following is a full, clear, and exact description of the same, reference being had to the accompanying drawings, forming part of this specification, in which—

Figure 1 is a side elevation of the entire wagon, showing an arrangement of the weighing devices. Fig. 2 is a vertical transverse section of the wagon-body, taken through the front standards, and showing another arrangement of the weighing devices. Fig. 3 is a detail of the differential windlass.

My invention relates to an improved construction of wagon designed to facilitate the dumping of coal and other heavy produce, and to weigh the same at the point of delivery and in the presence of the purchaser.

To these ends it consists, first, in combining with a wagon-body an internal vertically-adjustable shell, which contains the load and may be raised and inclined to discharge or dump the coal, and a set of weighing-scales, upon which scale the load may be made to rest to weigh its contents, or the load transferred to a rigid support during transportation.

It also consists in combining the vertically-adjustable shell, the wagon-body, and a set of ropes and pulleys with a differential windlass, by which a single individual is enabled in one operation to raise bodily the loaded shell and at the same time give it an inclination to dump the load, all as hereinafter more fully described.

In the drawings, A represents the body of a wagon, which is provided at each of its four corners with a heavy braced standard, B.

C is the shell for carrying the load, which shell is made of boiler-iron and fits within the body of the wagon, so as to fill the same and rest upon its bottom, as shown in dotted lines in Fig. 1. This shell is fastened at its four lower corners to the ends of ropes or chains D D', which pass over pulleys E E' at the tops of the standards B, thence pass around pulleys F F' at the bottom, and proceed from this point to a windlass, G, (see Fig. 3,) arranged transversely beneath the middle portion of the wagon. This windlass is provided at each end with differential drums H H', upon the larger of which drums H are wound the ropes D, that lead from the front of the shell, and upon the smaller of which drums are wound the ropes D', that lead from the rear end of the shell. The object of these differential drums is to enable a single individual to raise the shell to an elevated position, and at the same time to give it sufficient dip or inclination to the rear to dump or discharge its contents, it being obvious that the front ropes will be wound up more rapidly in consequence of the greater diameter of their drums, and that the front part of the shell will attain a greater elevation in a given number of turns of the windlass than the rear portion will. For turning this windlass gear-wheels H² are arranged at opposite ends of the same, into which pinions I are made to engage, which pinions are located on a counter-shaft, J, which is provided with a crank-handle, K.

For weighing the coal carried by the shell C, I may use two different constructions. Thus, as shown in Fig. 1, the bottom of the wagon-body may be formed like a platform-scales, and its mechanism be connected with an index-hand, L, on the side. In this case the said bottom, as constituting the weighing devices, is to be provided with adjusting-screws M, whose function is to set the platform of the scales—*i. e.*, the bottom of the wagon—to a horizontal position when the wagon is standing on an incline. With this form of weighing devices, also, the bottom of the wagon must be provided with one or more locking-bars, which may be adjusted so as to hold the platform rigid during transportation. For the other method of weighing, the shell with its load, instead of being weighed while supported in the bottom of the wagon, is arranged to be weighed while suspended in elevated position upon the four corner standards, B. For this purpose these standards are made hollow or grooved on their inner sides, (see Fig. 2,) and in these grooves are placed vertical slides N, upon which the pulleys E E' are journaled, so that the weight of the loaded shell, when in suspended position, comes entirely upon these slides. The lower ends of said slides pass through the bottom of the wagon, and are stepped upon the four levers, O, of a weighing-scales frame placed beneath the body of the wagon. This scales-frame consists of four levers hung to each corner of the wagon and converging to a ring or collar, P, beneath the center of the wagon-body, which ring is connected by link *a* to a lever, Q, hung to the wagon at *b*, and extending transversely to the wagon-body and connected by a link, R, to any suitable scale-beam on the side of a wagon in a well-known manner. It will thus be seen that in this modification the shell C and its load rest upon the bottom of the wagon-body during transportation, and when it is to be weighed at its destination the elevation of the shell upon the pulleys E E' throws the whole weight upon the slides M, which transmit it to the weighing-scales beneath the wagon. This form of weighing devices I prefer, for many reasons, to the other—first, because the load has a solid support during transportation; secondly, because the elevated position of the load in weighing enables the customer and the driver to see that the weight is properly on the weighing-scales, and, thirdly, because ordinary wagons may be fitted up with these appliances with but little alteration.

I am aware of the fact that a cart-body has been constructed with an internal shell combined with a set of weighing-scales, and that a wagon-body without scales has been provided with devices for raising and inclining it to dump its contents. I therefore only claim the combination of the wagon-body and its internal shell, when said shell is made adjustable, and also provided with weighing devices whereby the load may be placed on the weighing-scales at one time and transferred to a rigid support at another for transportation.

Having thus described my invention, what I claim as new is—

1. The combination, with the wagon-body and a set of weighing devices, of an internal shell, made adjustable, as described, so as to be thrown off or on the scales, and means for raising and inclining said shell for dumping the contents, as set forth.

2. The combination, with a wagon-body having standards at its corners, of an internal shell and a set of pulleys and ropes carried by said standards for raising the shell, as described.

3. The combination, with a wagon-body having standards at its four corners carrying pulleys, of a set of ropes passing over said pulleys, and a differential windlass having its larger drums connected with and arranged to wind up the front ropes, and its smaller drums connected with and arranged to wind up the rear ropes, substantially as described, and for the purpose of imparting an inclination to the shell contemporaneously with its elevation.

4. The combination, with a wagon-body having standards at its four corners with pulleys thereon, as described, of an adjustable shell fitting within the wagon-body and suspended upon cords passing over said pulleys, so as to be raised, and a set of weighing devices for weighing the shell in one of its positions and affording a solid bearing in the other, as described.

5. The combination, with a wagon body having elevated corner standards and a set of weighing devices beneath the same, of a shell fitting in the wagon-body, a set of ropes attached to the shell, a set of pulleys arranged in the standards and carrying the ropes, and a set of slides carrying these pulleys and extending through the wagon-body and supported upon the weighing devices, as and for the purpose described.

The above specification of my invention signed by me in the presence of two subscribing witnesses.

HENRY R. ROBBINS.

Witnesses:
SOLON C. KEMON,
CHAS. A. PETTIT.